(12) United States Patent
Cannon et al.

(10) Patent No.: US 7,103,154 B1
(45) Date of Patent: Sep. 5, 2006

(54) AUTOMATIC TRANSMISSION OF VOICE-TO-TEXT CONVERTED VOICE MESSAGE

(76) Inventors: Joseph M. Cannon, 913 Harcourt La., Harleysville, PA (US) 19438; James A. Johanson, 147 N. 10th St., Lehigh, PA (US) 18049

( * ) Notice: Subject to any disclaimer, the term of this patent is extended or adjusted under 35 U.S.C. 154(b) by 0 days.

(21) Appl. No.: 09/007,770

(22) Filed: Jan. 16, 1998

(51) Int. Cl.
- H04M 1/64 (2006.01)
- H04M 11/00 (2006.01)
- G10L 3/00 (2006.01)
- G10L 5/00 (2006.01)

(52) U.S. Cl. .......................... 379/67.1; 379/34; 379/52; 379/88.16; 379/93.24; 379/88.17; 704/260; 704/270

(58) Field of Classification Search ................ 379/67.1, 379/68, 74, 88.01, 88.07, 88.13, 88.16, 88.17, 379/88.18, 88.19, 88.21, 93.24, 93.35, 93.09, 379/102.02, 52; 709/206, 246; 704/258, 260, 704/272, 270; 455/556, 557, 563
See application file for complete search history.

(56) References Cited

U.S. PATENT DOCUMENTS

| | | | | |
|---|---|---|---|---|
| 5,327,486 A | * | 7/1994 | Wolff et al. ............... | 379/93.23 |
| 5,524,137 A | * | 6/1996 | Rhee .......................... | 379/67 |
| 5,557,659 A | * | 9/1996 | Hyde-Thomson ............ | 379/88 |
| 5,568,540 A | * | 10/1996 | Greco et al. .................. | 379/89 |
| 5,572,643 A | * | 11/1996 | Judson ........................ | 395/793 |
| 5,608,786 A | * | 3/1997 | Gordon ....................... | 379/100 |
| 5,621,658 A | * | 4/1997 | Jackson et al. .......... | 364/514 R |
| 5,661,783 A | * | 8/1997 | Assis .......................... | 379/67 |
| 5,742,905 A | * | 4/1998 | Pepe et al. ................... | 455/461 |
| 5,802,314 A | * | 9/1998 | Tullis et al. ................ | 709/246 |
| 5,870,549 A | * | 2/1999 | Bobo, II ..................... | 709/206 |
| 5,894,504 A | * | 4/1999 | Alfred et al. ............ | 379/88.13 |
| 5,915,237 A | * | 6/1999 | Boss et al. .................. | 704/258 |
| 5,943,398 A | * | 8/1999 | Klein et al. .............. | 379/88.13 |
| 6,052,442 A | * | 4/2000 | Cooper et al. ........... | 379/88.19 |

* cited by examiner

Primary Examiner—Allan Hoosain

(57) ABSTRACT

A voice messaging system includes an input device to accept a destination electronic messaging address, a voice-to-text converter to convert or transcribe a received voice message into a converted text message, and a processor to operate an electronic messaging program and to prepare the text message for automatic electronic transmission to the destination electronic messaging address. A method is also provided to convert a voice message into a text message and to transmit the same to a destination electronic messaging address. The method includes inputting a destination electronic messaging address. A received voice message is converted or transcribed into a text message and prepared as a text file. The prepared text file is automatically transmitted to the destination electronic messaging address. A log file including the text of the voice messages may be maintained with updates at a predetermined time interval. A database of the converted text messages may be generated and maintained to provide a searchable mechanism of archived messages.

33 Claims, 6 Drawing Sheets

Date:
Sender:
To:

Subject: _____

You have received 3 text message(s).

—601 message-1.txt

—602 message-2.txt

—603 message-3.txt

AUTOMATIC TRANSMISSION OF VOICE-TO-TEXT CONVERTED VOICE MESSAGE

BACKGROUND OF THE INVENTION

1. Field of the Invention

This invention relates generally to a voice messaging system. More particularly, it relates to transcription of a voice message into a text file and transmission of the same to a remote location.

2. Description of Related Art

Today, many people use a digital or tape answering machine or voice mail system to receive and play back voice messages. A digital answering machine stores messages in solid state memory. A tape answering machine stores messages on magnetic tape. A voice messaging system is typically used in conjunction with a private branch exchange (PBX) to provide voice messaging capability to a plurality of users.

Currently, the conventional way to listen to a voice message recorded on a voice messaging system is to play the message directly from the answering machine or to dial in to the answering machine or voice messaging system to hear the message over the telephone when the user is away from the voice messaging system.

FIG. 6 illustrates a conventional voice messaging system 308 such as a digital answering machine which generally includes a processor 402 connected to a read-only memory (ROM) 418 and random-access memory (RAM) 420 which may be a dynamic random access memory (DRAM), static random access memory (SRAM), or other suitable memory. A digital signal processor (DSP) 408 is connected to a digital-to-analog (D/A) converter 410 and an analog-to-digital (A/D) converter 412. A telephone line interface 414 interfaces the voice messaging system 308 to a telephone line 114 from a telephone company central office. The DSP 408 is also connected to ROM 404 and RAM 406 which may be DRAM, SRAM, or other suitable memory. The A/D converter 412 and/or D/A converter 410 may be integrated within the DSP 408. The digital answering machine 308 may be controlled by keypad entries entered on a telephone keypad (not shown) or by dual tone, multiple frequency (DTMF) tones received from remote locations over telephone line 114.

Together with other components shown in FIG. 6, the DSP 408 converts an input analog signal to digital data, converts digital data to an output analog signal, and converts DTMF tones to digital control data.

To reduce the physical memory requirements in the digital answering machine 308, DSP 408 compresses voice message data for storage in RAM 406 and decompresses the voice message data for playback. Conventional voice compression and decompression techniques include linear predictive coding (LPC), code-excited linear predictive (CELP) coding, and vector sum excited linear predictive (VSELP) coding. These compression and decompression algorithms minimize the amount of data required to represent a voice message. The DSP 408 operates in response to a predetermined program of instructions stored in ROM 404. The DSP 408 also includes a tone generator algorithm to provide DTMF tones to the telephone line 114 and a DTMF detector algorithm to detect DTMF tones.

To store an incoming voice message in voice messaging system 308, an input voice message is conveyed over the telephone line 114 to the telephone line interface 414, which in turn conveys the incoming voice message to the A/D converter 412. The A/D converter receives the analog signal from the telephone line 114, converts the electrical signals representative of the voice message to digital data, and conveys the digital data to the DSP 408. The ROM 404 stores instructions for controlling the DSP 408 including implementation of the compression algorithm. RAM 406 receives and stores the compressed voice message. Using clock generator 416, the DSP 408 may also provide a time and date stamp with the stored digital voice message in RAM 406.

To operate the voice messaging system 308 in a remote message playback and DTMF detection mode, the user listens to a recorded message from a remote telephone 302 over telephone lines 114, 502 as shown in FIG. 7. To playback the stored voice message, the user typically inputs DTMF tones to remotely control the voice messaging system 308 such that the voice messages are played back audibly at the remote telephone 302. The A/D converter 412 and DSP 408 receive the DTMF tones representing control signals which instruct voice message playback of voice messages stored in RAM 406, under the control of the processor 402. In response to control signals from the processor 402, the DSP 408 retrieves compressed voice messages from RAM 406 and conveys digital voice message data to the D/A converter 410. D/A converter 410 converts the digital voice message data to analog signals representative of an audible output and provides the analog signals to the telephone line 114 via telephone line interface 414.

FIG. 7 shows a remote connection to the voice messaging system 308. A user calls in to the voice messaging system 308 using a remote telephone 302 over telephone line 502 and public switched telephone network (PSTN) 306. The user calls in to determine if any voice messages have been left, and if so, the user plays back the voice messages stored at the voice messaging system 308 over the telephone 302. However, the user must repeatedly call in to the voice messaging system 308, whether or not a voice message exists, to determine if a voice message does in fact exist. Needless to say, this is very inconvenient for the user. Although the user may determine that no voice messages exist without completing a call, e.g., based on the number of rings allowed by the voice messaging system 308, the user must still call in repeatedly to the voice messaging system 308 to determine whether any voice messages have been left.

The conventional digital voice messaging system 308 does not, however, automatically inform a remote user of an incoming voice message. Repeated remote access to the voice messaging system 308 from remote telephone 302 is very inconvenient for the user. Moreover, remote access requires audible playback of the message which often takes more time to hear than it would to read if the message were transcribed. Additionally, access fees and other telephone company charges may apply for the remote access to the voice messaging system 308.

A conventional answering machine which allows a user to transcribe a recorded voice message is known. For instance, as shown in FIG. 8 herein, U.S. Pat. No. 5,661,783 to Assis teaches an answering machine 700 that is connected to a printer 712 via printer cable 708 and to a computer 714 via computer cable 710. The computer 714 may also be connected to printer 712 via cable 718. A user local to the answering machine 700 may generate a written transaction of a recorded message by printing out a journal of all the caller voice messages on printer 712 and/or by displaying the caller voice messages on the computer monitor 716 and thereafter tagging selected caller voice messages which may then be printed on printer 712. While such a system allows printing of a transcribed message, it does not alleviate the need for a remote user to repeatedly call in to determine whether or not a voice message has been received.

There is a need for a voice messaging system which accumulates transcribed voice messages over time, and for a voice messaging system which automatically transmits transcribed voice messages to a remote location for reading rather than for listening.

SUMMARY OF THE INVENTION

In accordance with the principles of the present invention, a voice messaging system includes an input device to accept a destination electronic messaging address, a converter to convert the voice message to a text message, and a processor to operate an electronic messaging program, to prepare the text message for electronic transmission, and to automatically transmit the prepared text message to the destination electronic messaging address.

The present invention further provides a method for sending a text message to a destination electronic messaging address, including inputting a destination electronic messaging address, converting a received voice message into a text message, preparing the text message as a text file, and automatically transmitting the text file to the destination electronic messaging address.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
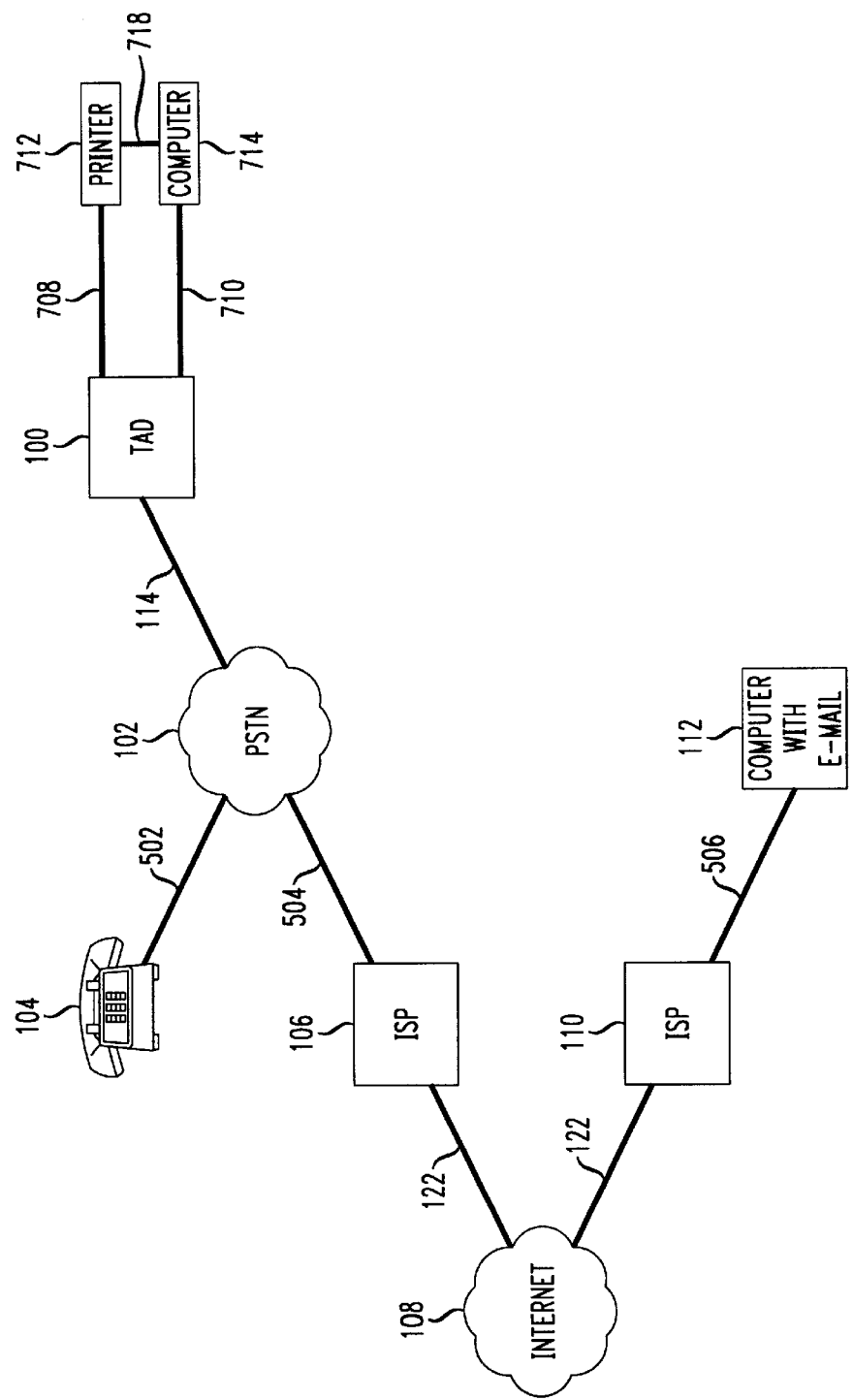
FIG. 1 shows the path of a telephone answering device sending a text converted received voice message to a remote computer using electronic messaging according to the present invention.

FIG. 1 shows a path used by a digital voice messaging system to send a text converted voice message to a local or a remote location, i.e., over the Internet to a remote computer 112, according to the present invention.

In FIG. 1, a remote telephone 104 is connected to the PSTN 102 via telephone line 502. A voice messaging system 100 is connected to the PSTN 102 via telephone line 114. A user of a remote telephone 104 leaves a voice message on a voice messaging system, such as a digital telephone answering device (TAD) 100 by calling the TAD 100 from the remote telephone 104.

According to the principles of the present invention, the TAD 100 automatically converts or transcribes the voice message left from the remote telephone 104 to a text file and electronically transmits the text file to a remote location based on at least one destination address input into the TAD 100. In a preferred embodiment, the electronic transmission is e-mail transmitted via the Internet. In this embodiment, the converted text file is transcribed into an ASCII file and e-mailed either as an e-mail file or as a file attached to a predetermined e-mail file.

In an alternative aspect of the present invention, the content of the converted text file or caller information such as Caller ID information may be scanned, the completion of which triggers the electronic transmission of a pre-programmed e-mail message such as "your mother called". The converted text message may trigger a non-content based message to be e-mailed to the pre-programmed destination address such as "your voice messaging system has four messages." The digital voice message itself may be attached to the e-mail message containing the converted text message electronically transmitted by the TAD 100.

More than one e-mail address may be input into the TAD 100 with the results being that the electronically transmitted converted text files are e-mailed to a plurality of destinations, e.g., the user's home, work and supervisor's addresses.

In addition to the e-mail destination address, the user of the TAD 100 may establish a schedule in the TAD 100 for sending out e-mail messages to the input destination e-mail addresses. According to the pre-established schedule, the TAD 100 sends out each e-mail containing a converted text file to the destination e-mail addresses at predetermined times, e.g., at midnight, as soon as they are received by the TAD 100 or periodically throughout the day.

In the exemplary embodiment, the e-mail is sent from the TAD 100 to a computer 112 over the Internet 108 using respective Internet service providers (ISPs) 106, 110. The computer 112 has the capability to receive e-mail. An e-mail subscriber using the computer 112 receives the e-mail containing the converted text file. Other electronic messaging schemes may alternatively be used, e.g., one-way paging, two-way paging, or a Cellular Packet Data Protocol (CPDP) system.

The ISP 106 is connected to the Internet 108 via a suitable high speed line 122 such as a T1 or T3 rate trunk line. The computer 112 is connected to the Internet 108 through ISP 110, telephone line 506 and a suitable high speed line 122. Alternatively, the TAD 100 may be connected to ISP 106 via a direct line such as coaxial cable, or an integrated services digital network (ISDN) line. The computer 112 may also be alternatively connected to ISP 110 via a direct line such as a coaxial cable, or an ISDN line.

Although the TAD 100 is a digital answering machine in the disclosed embodiment, the present invention is equally applicable to voice messaging systems in general, e.g., a voice-mail system used in conjunction with a private branch exchange (PBX).

Figure 2:
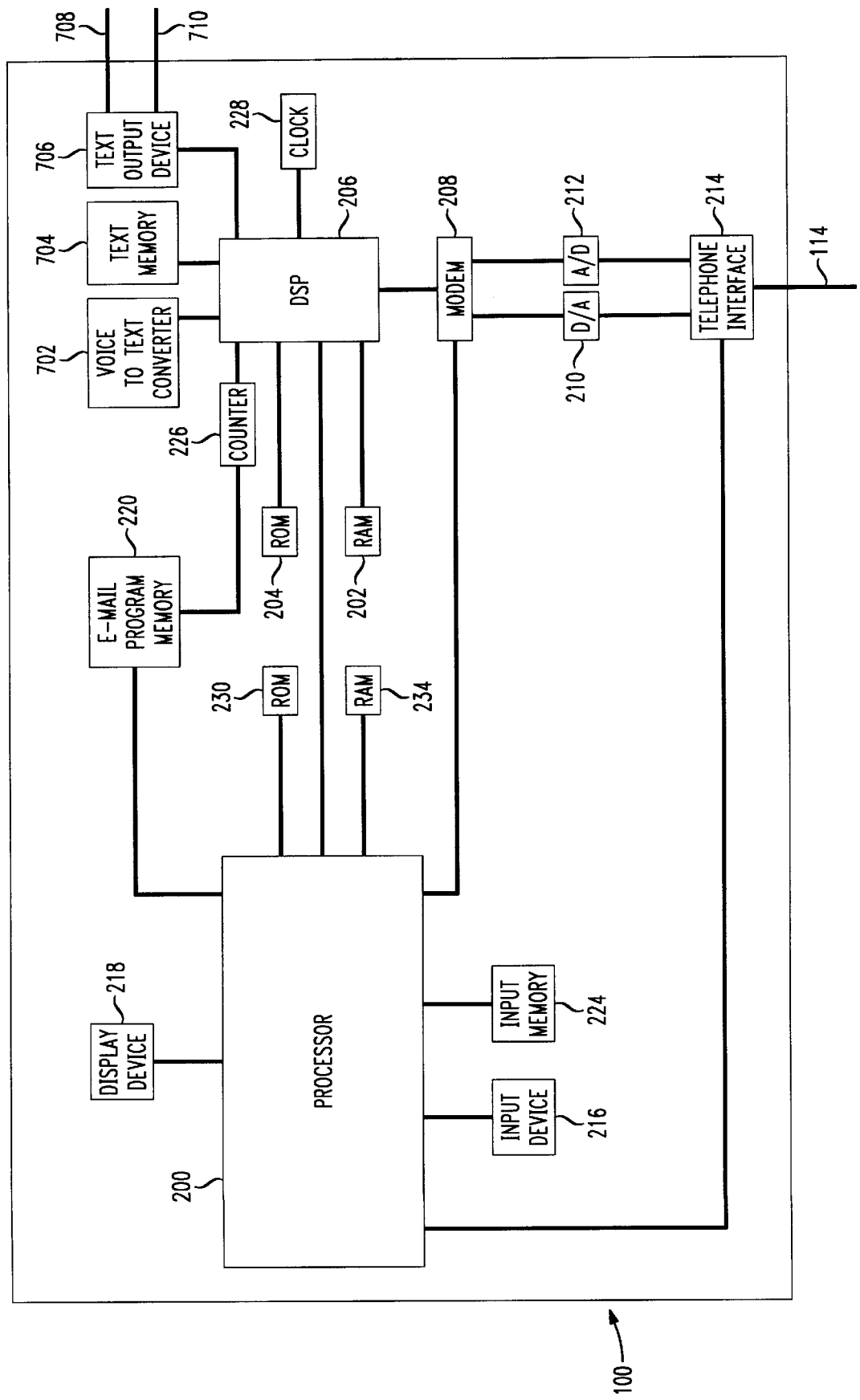
FIG. 2 shows a telephone answering device according to the present invention.

FIG. 2 shows the TAD 100 in more detail. TAD 100 includes a processor 200 connected to random access memory (RAM) 234, read only memory (ROM) 230 and telephone interface 214. TAD 100 further may include a separate processor such a digital signal processor (DSP) 206. The functionality of the processor 200 and DSP 206 may be combined into a single processor such as a DSP. DSP 206 is connected to digital-to-analog (D/A) converter 210, analog-to-digital (A/D) converter 212, voice message storage RAM 202, and program ROM 204. These elements individually operate similarly to those in a conventional digital answering machine 308 such as that shown in FIG. 6.

TAD 100 further includes a voice-to-text converter 702 to convert a received voice message to a text message, and text memory 704 to store the converted or transcribed voice messages. The text message may instead be stored in voice message storage RAM 202. A text output device 706 prepares the converted text message for printing, for displaying and/or for outputting to a computer file, similar to the conventional voice messaging system 700 shown in FIG. 8. Thus, a voice message recorded on TAD 100 may be transcribed and printed out directly on printer 712 (FIG. 1), may be stored in computer 714 (FIG. 1) as a text file or displayed on a display device. A user may select the desired output mode (i.e., print, display or store text file).

The voice to text feature can be turned on or off by input from the user.

Once converted to a text file, the original voice message may optionally be deleted, providing an ultimate form of data compression of the voice message. After the text file is either entered into the log file, e-mailed, or otherwise disposed of, the original text file may be deleted at the TAD 100.

According to the present invention, the voice to text converter 702, the text memory 704, the text output device 706, and the DSP 206 may all be implemented within a single processor, e.g., a DSP. The DSP containing the voice-to-text converter 702 and text output device 706 may be located within TAD 100 or on an optional accessory which may be inserted into and removed from TAD 100.

The voice to text converter 702 converts digital voice message data from DSP 206 into ASCII characters. Any industry standard speech to text conversion routine may be used such as voice recognition software commercially available from Dragon Systems, Inc. or IBM, for example.

A display device 218 is connected to processor 200. The display device 218 may be a liquid crystal display (LCD) device. The display 218 may be used to view information such as the date and time when the voice message was received, the telephone number dialed for access to the Internet, or caller ID type information relating to an incoming call. The display 218 may further be used to display the contents of the converted text file.

The text memory 704 may be located in the TAD 100, in a floppy drive or in a network drive. A user may designate that the converted text file be a cumulative log file including all voice messages or only some of the voice messages. Alternatively, each converted text file may contain only one message. Furthermore, in accordance with the present invention and unlike the prior art, the cumulative log file may be updated hourly, daily, weekly, monthly, etc., as specified by a user, and thus contain a plurality of converted text messages. Thus, the TAD 100 may be programmed to store one converted text message per text file, all undeleted messages per text file, or a group of messages per text file based on a selection made by the user, or based on a certain time frame (e.g., hourly, daily, weekly, monthly).

Many of the elements shown in FIG. 2 may be implemented withing one or more processor elements such as a DSP. For instance, the voice-to-text converter 702, text memory 704, text output device 706, counter 226, ROM 204, RAM 202, e-mail program memory 220, clock 228, modem 208, D/A converter 210, A/D converter 212, and/or input memory 224 may be implemented withing a DSP.

Figure 3:
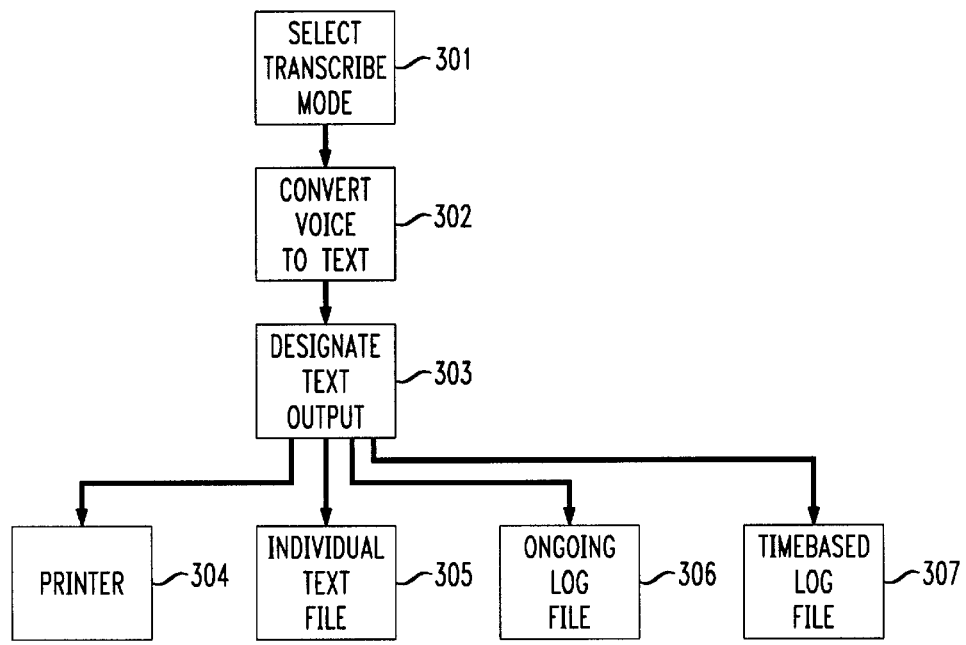
FIG. 3 is a flow diagram illustrating an operation of the telephone answering device according to an aspect of the present invention.

FIG. 3 is a flow diagram illustrating an operation of the TAD 100 as controlled by processor 200 (FIG. 2). The voice to text feature (i.e., the transcribe mode) is selected by the user at step 301.

The voice message is converted to a text message at step 302. Step 302 may be performed as each voice message is received, or based on a time schedule, e.g., every hour or during times when the TAD 100 is not performing other significant tasks such as receiving a call.

The designated text output type is determined at step 303. Possible output types include ASCII, or application type format such as Microsoft Word, Microsoft Access database record, etc.

If the text is to be printed, TAD 100 sends the converted text file to the printer at step 304. If the text is to be stored only in memory, TAD 100 opens a new file in the text memory 704 (FIG. 2) and writes the text data at step 305. If the text is to be sent to an ongoing log file, TAD 100 opens the log file and appends the converted text data to the log file at step 306. If the converted text is in a time frame based log file, TAD 100 opens the log file at the beginning of the time period or as soon as a first voice message is received during that time period, writes the text data, and closes the log file at the end of the designated time period at step 307. Options that specify type of format of the printout are possible. For instance, the font, color, or size may be designated for printout.

The log file containing a plurality of converted text messages, or an individual converted text file output from text output device 706 (FIG. 2) may be input to computer 714 (FIG. 1). The computer 714 may generate a database of the converted text messages, display the converted text messages, or even voice synthesize the converted voice messages. A hard drive in the computer 714 contains an application program used by a processor in the computer 714 to maintain a database of converted text messages from the TAD 100.

The computer 714 may be a server. A user may sort data in the database, may search for data such as spoken phrases in the database, may query the database, may generate reports of converted text messages, may generate tables of converted text messages, may retrieve and print individual converted text files, etc. For each converted text message, the database may also store a time of a call, a name of a caller, etc., using caller ID information. This information may also be queried or searched in the database.

Converted text files of recorded voice messages allow for easy incorporation of their content into documentation, archived log files and a log file database. Plus, text files of the voice messages may be e-mailed to facilitate fast communication of message content regardless of the format of the source.

Figure 6:
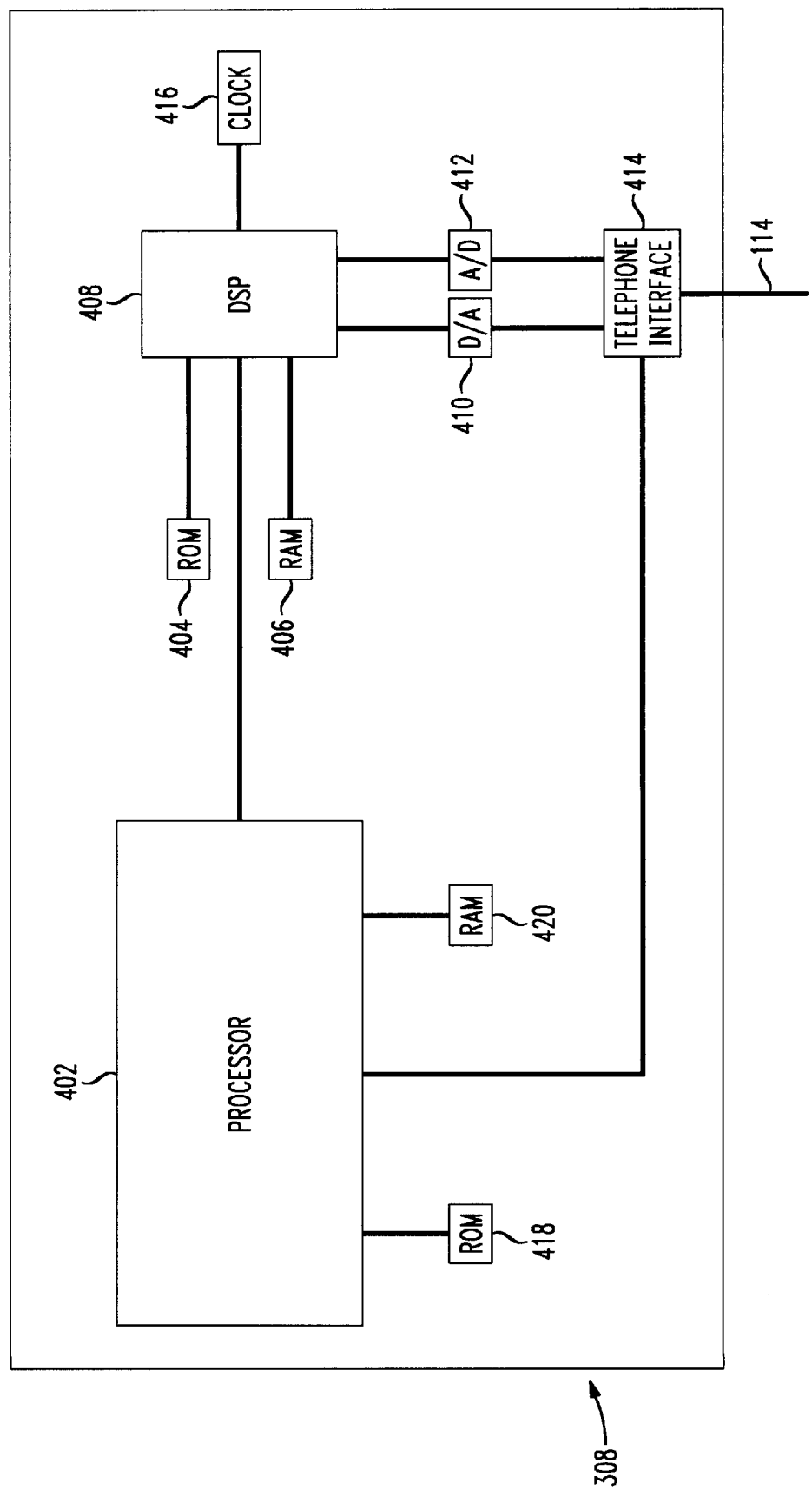
FIG. 6 shows a conventional digital answering machine.
Figure 7:
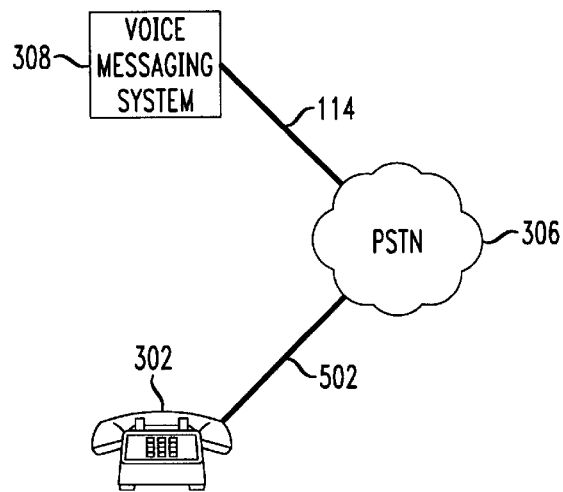
FIG. 7 shows the path of a conventional voice messaging system sending a voice message over a telephone network.
Figure 8:
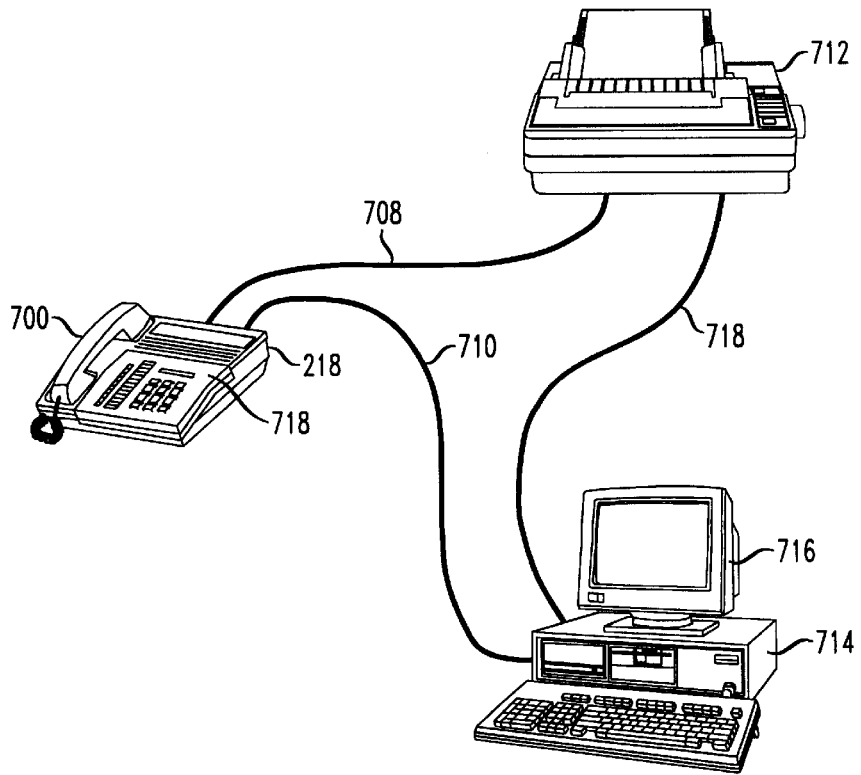
FIG. 8 shows a conventional answering system connected to a printer and to a computer for transcribing a voice message.

TAD 100 also has Internet access and dialing capabilities to an ISP, unlike the conventional digital answering machines 308 and 700 shown in FIGS. 6–8. Therefore, in accordance with the present invention, as shown in FIG. 2, TAD 100 further includes an input device 216, an input memory 224, an e-mail program memory 220, and a modem 208, all connected to processor 200. The modem 208 and e-mail program memory 220 also connect to DSP 206. The DSP 206 conveys the text file to modem 208 which sends the converted text file to a destination e-mail address over telephone line 114.

The TAD 100 may also include a clock generator 228 to provide a time and day stamp. The display device 218 may be used to view the data input to input device 216 and/or to observe data received from the telephone line 114 through the modem 208 using a standard protocol for interfacing to a display-based telephone, e.g., analog display services interface (ADSI).

The e-mail is transmitted over the Internet. The destination e-mail address is stored in the input memory 224. The voice message or messages stored in the voice message portion of RAM 202 will be converted to text and electronically transmitted to each corresponding destination e-mail address in the input memory 224.

The schedule in TAD 100 may indicate how often the voice message portion of RAM 202 should be monitored by the DSP 206 for unconverted voice messages, and how often the voice messages should be converted and electronically transmitted to the destination e-mail address. Converted text messages can be e-mailed immediately upon reception or as a group on a periodic basis, e.g., once a day. For example, the converted text messages may be e-mailed to the destination address immediately after the voice message is received, at the next one of a designated interval such as every 20 minutes, or at designated times such as at midnight when telephone charges are presumed lowest. The e-mail feature may be turned off on TAD 100, e.g., for times when the user is at home or local to the TAD 100.

The destination e-mail address and/or transmission schedule may be programmed from a preexisting internal database. In this case, input memory 224 or ROM 204 may include a database of e-mail addresses and incoming telephone numbers arranged in a table format. Particular incoming telephone numbers can trigger different modes within the TAD 100. The database may include a transmission schedule corresponding to the e-mail addresses and incoming telephone numbers stored in the database. Telephone numbers, corresponding e-mail addresses, and corresponding schedules may be input through input device 216 or computer/keyboard 714 to develop the database.

The e-mailing feature of the TAD 100 may be triggered from pre-selected remote locations. For instance, call information services such as caller ID can be used to trigger e-mail by transferring the telephone number of an incoming call to TAD 100 between the first and second rings. Using caller ID, processor 200 searches the database of telephone numbers in input memory 224 or RAM 204 to detect a triggering match with the telephone number of the incoming call. If a match is found, processor 200 e-mails unsent converted text messages to the corresponding destination e-mail address. The caller ID data may also include a name of the caller and/or the time of the call. The processor 200 may search for a triggering match between any portion of the caller ID information, and enter a particular mode based on a match of that portion of the caller ID data with the database. For instance, an area code of an incoming call, a last name of a caller, or a time of a call may trigger the electronic transmission of converted text messages to the corresponding destination e-mail address.

A destination e-mail address may be one or more e-mail addresses, or no e-mail address at all effecting that the converted text messages not be e-mailed and may be selected based on caller ID data. For example, a first programmed telephone number may correspond to a first programmed e-mail address to which text messages are e-mailed. A second programmed telephone number may correspond to a second programmed e-mail address. A third programmed telephone number may correspond to both a first and second e-mail address, and a fourth programmed telephone number may correspond to no e-mail address.

Figure 4:
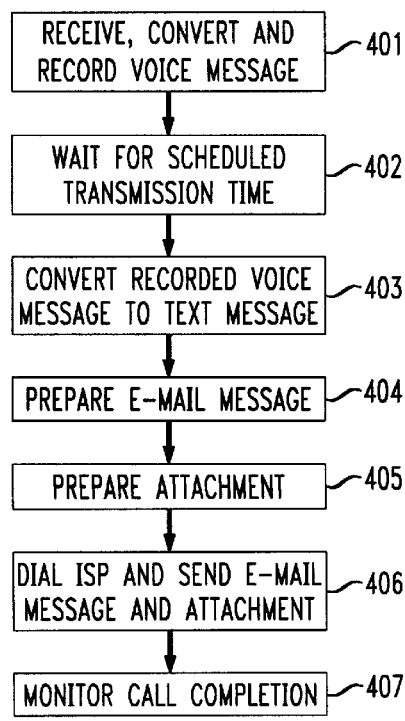
FIG. 4 is a flow diagram illustrating an operation of the telephone answering device according to an aspect of the present invention.

FIG. 4 is a flow diagram illustrating a scheduling operation of the TAD 100 as controlled by processor 200. When the automatic e-mailing function is enabled, a voice message is received, converted to a text message and stored at step 401. At step 402, the TAD 100 waits for the time at which the schedule indicates that an e-mail message is to be sent. At step 403, TAD 100 prepares the converted voice message into a text message for electronic transmission. TAD 100 prepares the e-mail message at step 404. TAD 100 attaches the converted text file to a pre-prepared e-mail message at step 405. At step 406, TAD 100 accesses the ISP 106 and sends the e-mail message and attachment to the destination e-mail address. At step 407, TAD 100 monitors for completion of sending the e-mail and then goes on-hook.

E-mail program memory 220 stores a program for sending an email message. The e-mail program is a conventional program for implementing e-mail functions. E-mail program memory 220 may also store predetermined e-mail messages indicating the status of the TAD 100. For instance, standard messages may be pre-programmed but sent only after being triggered by the processor 200. For instance, one preprogrammed message may indicate the number of unsent converted text messages.

A counter 226 shown in FIG. 2 counts the number of converted text messages not electronically transmitted. Upon polling by DSP 206, a predetermined e-mail message such as "You have received N text message(s)" may be sent to the destination address, where N indicates the number of converted text messages which were not previously e-mailed. The predetermined e-mail message may include attachments corresponding to the converted text message(s) or the voice messages themselves.

Figure 5:
FIG. 5 shows a computer screen including an electronic mail message and an attached text message file according to an embodiment of the present invention.
Figure 5:
Figure 5:

FIG. 5 shows an example of an e-mail message which indicates "You have received 3 text messages." The e-mail message indicates that three attached text files 601–603 were also sent with the e-mail message.

Referring back to FIG. 1, the converted text file can be sent to computer 714, e-mailed to computer 112 or printed at printer 712 in a conventional manner. To receive the e-mail, a user of computer 112 logs onto an e-mail account and downloads e-mail from a mailbox on a mail server of ISP 110.

Modem 208 supports a number of different protocols. When modem 208 connects with a second modem at the ISP 106, the two modems negotiate to find a common protocol over which to send the e-mail message and attachment.

Clock generator 228 monitors the time at which each voice message is received by the TAD 100. The day, date and/or time each voice message is received based on clock generator 228 is stored along with the voice message in the voice message portion of RAM 202. This information may accompany the converted text message sent to the destination e-mail address.

As a result of the present invention, a remote user does not have to repeatedly call a voice messaging system to audibly check for messages, nor pay telephone charges to repeatedly dial in to the voice messaging system to check for voice messages. Rather, converted text messages are automatically electronically transmitted to a destination address either based on a predetermined schedule or as remotely triggered by an incoming call. Furthermore, multiple destination e-mail addresses may be programmed into the voice messaging system. At a remote computer, e-mailed text messages may be placed on removable mass storage media in text format, printed at a printer, or otherwise permanently recorded to archive received messages.

While the invention has been described with reference to the exemplary preferred embodiments thereof, those skilled in the art will be able to make various modifications to the described embodiments of the invention without departing from the true spirit and scope of the invention.

We claim:

1. A voice message to text conversion system, comprising:
   a voice-to-text converter in customer premises equipment to convert a voice message received by a customer premises voice messaging system to an ASCII text message;
   a processor in customer premises equipment to prepare said text message for distribution by electronic mail to a destination electronic messaging address; and
   a transmission device in customer premises equipment to electronically mail said prepared text message to said destination electronic messaging address.

2. The voice message to text conversion system according to claim 1, wherein:
   said transmission device electronically transmits said prepared text message automatically.

3. The voice message to text conversion system according to claim 1, wherein:
   said electronic transmission utilizes e-mail over an Internet.

4. The voice message to text conversion system according to claim 1, wherein:
   said transmission device electronically transmits said text message to said destination electronic messaging address based on a schedule.

5. The voice message to text conversion system according to claim 4, wherein:
   said schedule indicates to automatically electronically transmit said text message substantially immediately after said voice message is converted.

6. The voice message to text conversion system according to claim 4, wherein:
   said schedule indicates to automatically electronically transmit said text message at a specified time.

7. The voice message to text conversion system according to claim 4, wherein:
   said schedule indicates to automatically electronically transmit said text message at a next occurrence of a periodic event.

8. The voice message to text conversion system according to claim 4, wherein:
   said transmission device electronically transmits said text message to each of a plurality of destination electronic messaging addresses based on each of a respective plurality of schedules.

9. The voice message to text conversion system according to claim 1, further comprising:
   a memory in customer premises equipment to store a plurality of converted text messages; and wherein:
   said transmission device automatically electronically transmits said plurality of converted text messages.

10. The voice message to text conversion system according to claim 1, further comprising:
    a memory in customer premises equipment to store a plurality of voice messages;
    a counter in customer premises equipment to count a number of said plurality of voice messages stored in said memory; and wherein:
    said transmission device automatically electronically transmits said number of said plurality of voice messages with said text message to said destination electronic messaging address.

11. The voice message to text conversion system according to claim 1, further comprising:
    a clock in customer premises equipment to link a day, a date and a time to said text message; and
    an electronic messaging program in customer premises equipment which includes said day, said date, and said time with said text message.

12. The voice message to text conversion system according to claim 1, further comprising:
    a memory in customer premises equipment to relate a plurality of call information to a plurality of corresponding destination electronic messaging addresses.

13. The voice message to text conversion system according to claim 12, further comprising:
    a processor in customer premises equipment to determine a match between incoming call information and said call information in said memory; and wherein:
    said transmission device automatically sends said text message to at least one of said plurality of corresponding destination electronic messaging addresses based on said match.

14. A voice message to text conversion system, comprising:
    an input device in customer premises equipment to accept a destination electronic messaging address;
    a voice-to-text converter in customer premises equipment to convert a voice message received by a customer premises voice messaging system to an ASCII text message; and
    a processor in customer premises equipment to operate an electronic messaging program and to electronically mail said text message to said destination electronic messaging address.

15. The voice message to text conversion system according to claim 14, wherein:
    said text message is automatically transmitted by said processor.

16. A voice message to text conversion system, comprising:
    a memory in customer premises equipment to store a plurality of voice messages received by a customer premises voice messaging system;
    a voice-to-text converter in customer premises equipment to convert said plurality of voice messages to a corresponding plurality of ASCII text messages; and
    an output device in customer premises equipment to update at a predetermined time interval a log file including text contained in said plurality of ASCII text files.

17. The voice message to text conversion system according to claim 16, wherein:
    said predetermined time interval is hourly.

18. The voice message to text conversion system according to claim 16, wherein:
    said predetermined time interval is daily.

19. A voice message to text conversion system, comprising:
    a memory in customer premises equipment to store a plurality of voice messages received by a customer premises voice messaging system;
    a voice-to-text converter in customer premises equipment to convert said plurality of voice messages to a corresponding plurality of ASCII text messages;

an output device in customer premises equipment to prepare said plurality of converted ASCII text messages as a plurality of text files, and to update a log file relating to said plurality of text files; and a processor in customer premises equipment to maintain a database including text contained in said plurality of ASCII text messages.

20. The voice message to text conversion system according to claim 19, further comprising:

an input device in customer premises equipment to query said database.

21. The voice message to text conversion system according to claim 19, further comprising:

an input device in customer premises equipment to instruct a sorting of said database.

22. The voice message to text conversion system according to claim 19, wherein said database further comprises:

a time stamp corresponding to when each of said plurality of received voice messages corresponding to said plurality of ASCII text messages was received.

23. The voice message to text conversion system according to claim 19, wherein said database further comprises:

call information relating to each of said plurality of ASCII text messages.

24. The voice message to text conversion system according to claim 23, wherein:

said call information includes caller ID information.

25. A method for converting a voice message to a text message and for transmitting same to a destination electronic messaging address, comprising:

converting in customer premises equipment a voice message received by a customer premises voice messaging system to an ASCII text message;

preparing in customer premises equipment said converted ASCII text message as an electronic message; and electronically mailing from customer premises equipment said converted text message to a destination electronic messaging address.

26. The method for converting a voice message to a text message and for transmitting same to a destination electronic messaging address according to claim 25, wherein said step of automatically transmitting comprises:

transmitting said converted text message over an Internet to said destination electronic messaging address, said electronic message being e-mail.

27. The method for converting a voice message to a text message and for transmitting same to a destination electronic messaging address according to claim 25, wherein said step of preparing comprises:

including a pre-programmed text message with said converted text message.

28. The method for converting a voice message to a text message and for transmitting same to a destination electronic messaging address according to claim 25, further comprising:

transmitting said converted text message to said destination electronic messaging address based on a schedule.

29. The method for converting a voice message to a text message and for transmitting same to an electronic messaging address according to claim 28, wherein said step of inputting a schedule comprises:

indicating to automatically transmit said converted text message substantially immediately after said voice message is converted.

30. The method for converting a voice message to a text message and for transmitting same to an electronic messaging address according to claim 28, wherein said step of inputting a schedule comprises:

indicating to automatically transmit said converted text message at a specified time.

31. The method for converting a voice message to a text message and for transmitting same to an electronic messaging address according to claim 28, wherein said step of inputting a schedule comprises:

indicating to automatically transmit said converted text message at a next one of a periodic event.

32. A method for transcribing and logging a received voice message, through a voice messaging machine, comprising:

converting in customer premises equipment a plurality of received voice messages into a corresponding plurality of converted ASCII text messages;

preparing in customer premises equipment said plurality of converted ASCII text message as a corresponding plurality of text files; and updating in customer premises equipment, at a predetermined time interval, a log file relating to text contained in said plurality of text files.

33. A method for transcribing and logging a voice message, through a voice messaging machine, comprising:

converting in customer premises equipment a plurality of received voice messages into a corresponding plurality of converted ASCII text messages;

preparing in customer premises equipment said plurality of converted ASCII text message as a corresponding plurality of text files;

updating in customer premises equipment a log file relating to text contained in said plurality of text files; and maintaining in customer premises equipment a database including said plurality of converted text files.

* * * * *